Patented May 8, 1951

2,551,682

UNITED STATES PATENT OFFICE 2,551,682

MORPHOLINE SALICYLATES AND THEIR PREPARATION

Jules Henri Théophile Ledrut, Saint-Gilles, Belgium, assignor to Heyden Pharmacal Company, New York, N. Y., a corporation of Delaware No Drawing. Application July 16, 1947, Serial No. 761,417. In Belgium November 13, 1946

8 Claims. (Cl. 260—247.2)

The present invention which is due to Mr. J. Ledrut has for its object a process for the preparation of a salicylate and a salt of a base of the morpholine series, in which a salicylate of a base of the morpholine series is prepared.

Of the bases of the morpholine series which can be utilised in the process above defined, morpholine and its homologues such as methylmorpholine, ethylmorpholine, phenylmorpholine, etc. . . . may be cited.

According to a preferred mode of carrying out the invention, salicylic acid is caused to act on an equimolecular quantity of a base of the morpholine series.

It is also possible to start from a salt of salicylic acid and from a salt of a base of the morpholine series. In this case a salt of salicylic acid is caused to act on an equimolecular quantity of a salt of a base of the morpholine series in solution so as to form, by double decomposition of the reagents present, the salicylate of the base under consideration.

When operating as has just been indicated, it is preferable to employ as the reagent a salt of salicylic acid which will give rise in the presence of a salt of a base of the morpholine series, to the formation of the salicylate of the base under consideration and of an insoluble salt which is separated from the soluble salicylate formed.

The morpholine salicylate or the salicylate of a base of the morpholine series obtained by the process described above is impure. It is produced in the form of a yellowish solid melting at 92° to 94° C. Moreover an agglomeration may prevent in the preparation of morpholine salicylate the reaction between the salicylic acid and the morpholine from being total.

In order to obtain a product exhibiting the characteristics of a pure compound and to prevent, if necessary, the agglomeration above referred to, the reagents are caused to act, according to the present invention, in the presence of an organic solvent in which at least one of the two reagents above referred to is soluble.

According to an advantageous particularity of the invention, the two reagents above referred to are soluble in the organic solvent above mentioned.

Of the organic solvents which are suitable for carrying out the process according to the invention, toluene, xylene, petroleum ether and the aliphatic oxide ethers such as ethylic ether may be cited.

Salicylic acid and morpholine are soluble in the solvents hereinabove mentioned, but the salicylate of morpholine is insoluble in these solvents.

Chlorinated organic solvents, such as carbon tetrachloride, trichlorethylene and chlorobenzene, in which salicylic acid is slightly soluble and morpholine salicylate is insoluble, but in which morpholine is soluble, are likewise suitable for carrying out the process according to the present invention.

Finally, although their use renders the process more complicated, organic solvents such as methanol, ethanol, normal propanol, isopropanol, the amyl alcohols, the butyl alcohols, the octylic alcohols, benzyl alcohol, ethyl acetate, anisol, acetone, benzene, nitrobenzene, chloroform and butyl bromide, in which salicylic acid, morpholine and morpholine salicylate are soluble, may likewise be employed in the process according to the present invention.

The invention relates likewise to a process for the preparation of a salicylate of a base of the morpholine series, in which salicylic acid is caused to act on an equimolecular quantity of a base of the morpholine series.

In order to eliminate the impurities which accompany the salicylate formed in this process, the salicylate formed as above mentioned is dissolved in an organic solvent in which the above mentioned impurities are insoluble, the said impurities then separated and finally the salicylate crystallised out.

When the reaction between the salicylic acid and the base of the morpholine series is carried out in an aqueous medium, the salicylate in aqueous solution is extracted by the help of an organic solvent which is not miscible with water, the organic solution of the salicylate is then isolated and finally the salicylate is crystallised out.

Finally if the salicylate of a base of the morpholine series is obtained by causing a salt of salicylic acid to act in aqueous solution on an equimolecular quantity of a salt of the base under consideration, the salicylate formed by the double decomposition of the reagents present is extracted by means of an organic solvent which is not miscible with water, the organic solution of the salicylate then isolated and finally the salicylate is crystallised out.

The invention likewise has for its object the salicylate of morpholine or of a base of the morpholine series obtained by the process according to the present invention.

Compared with sodium salicylate, salicylate of morpholine is advantageous as a medicament in that it is eliminated much more slowly than salicylate of sodium.

Furthermore, whereas sodium salicylate cannot be administered intramuscularly, but must, on the contrary, be administered intravenously, salicylate of morpholine can be readily administered intramuscularly.

Other particularities and details of the invention will appear in the following examples, which illustrate, by way of non-limitative examples, some preferred modes of carrying out the present invention.

*Example I*

To 87 parts by weight of morpholine are slowly added, while agitating and cooling, 138 parts by weight of salicylic acid. The crystals of morpholine salicylate obtained are dried or centrifuged. The reaction between the salicylic acid and the morpholine may be shown as follows:

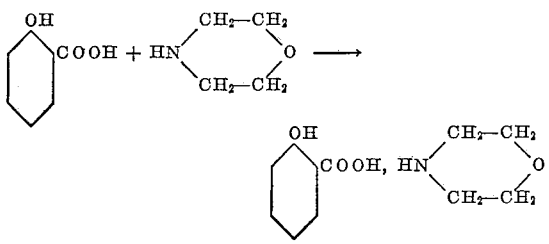

*Example II*

The mode of procedure is the same as in Example I, but the salicylic acid is caused to act on 101 parts by weight of methylmorpholine. Salicylate of methylmorpholine is obtained.

*Example III*

To an aqueous solution of morpholine of known concentration containing for example 87 parts by weight of morpholine, are added under the conditions specified above, 138 parts by weight of salicylic acid. In this way a solution of morpholine salicylate is obtained which can be employed directly in the form of solution or from which the salicylate can be extracted by crystallisation.

*Example IV*

123.5 parts by weight of morpholine chlorhydrate are dissolved in water. To this solution are added 245 parts of silver salicylate. The precipitate of silver chloride which is formed is separated by filtration. The filtrate contains morpholine salicylate.

The reaction between the chlorhydrate of morpholine and the salicylate of silver may be represented as follows:

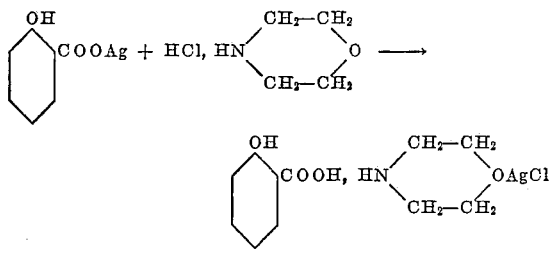

*Example V*

Morpholine sulphate dissolved in water is caused to act on an equimolecular quantity of barium salicylate. After the precipitate of barium sulphate formed by the double decomposition of the starting reagents has been eliminated, a solution of morpholine salicylate is obtained.

Instead of using salts of morpholine such as the chlorhydrate or the sulphate, the corresponding salts of the homologues of the morpholine series can be used. In such case the corresponding substituted morpholine salicylates are obtained.

*Example VI*

435 parts by weight of morpholine are dissolved in 2400 parts of ethyl alcohol at 99°. To this alcoholic solution is added in small portions, while agitating and cooling, 690 parts by weight of solid salicylic acid.

When the reaction is over, the solution is complete. At the end of a certain time fine crystals of morpholine salicylate are obtained by cooling which are centrifuged, washed and dried.

The morpholine salicylate formed melts at 110° to 111° C.

The yield of the process is raised to 53%.

The morpholine salicylate contained in the mother liquors can be recovered either by concentrating them or by precipitating the salicylate with the help of a solvent in which it is insoluble.

*Example VII*

138 parts by weight of salicylic acid dissolved in 500 parts of ether are added while agitating and cooling, to 87 parts by weight of morpholine.

The morpholine salicylate formed precipitates. It is washed with ether and dried. The yield reaches to 99%. The product obtained melts at 110° to 111° C.

*Example VIII*

87 parts by weight of morpholine are mixed with 500 parts by weight of toluene. To this mixture are added, while agitating and cooling, 138 parts by weight of solid salicylic acid. The agglomerated product is centrifuged, washed with toluene and dried. The yield is 91%. The morpholine salicylate formed melts at 110° to 111° C.

*Example IX*

To 138 parts by weight of salicylic acid are slowly added, while agitating and cooling, 87 parts by weight of morpholine (B. P. 128° C./760 mm.). When the addition of the morpholine has been completed, the mixture is diluted with the help of 100 parts of ethylic alcohol. After heating till solution is complete, the solution is filtered whilst hot. The filtrate is cooled and crystals are obtained which are centrifuged, washed with ether and dried. The yield is 53%.

*Example X*

The mode of procedure adopted is the same as in Example III or in Example IV. The aqueous solution of morpholine salicylate is then extracted by means of chloroform.

The chloroform solution obtained is dried over sodium sulphate.

After filtration of the sodium sulphate, the solvent is driven off in vacuo and the morpholine salicylate obtained is recrystallised from a mixture of 1 part of ethylic alcohol and 10 parts of tetrachloride of carbon.

After centrifuging, washing with the mixture of alcohol and carbon tetrachloride specified above, and drying morpholine salicylate melting at 110° to 111° C. is obtained.

It is obvious that the invention is not limited exclusively to the examples which have just been described and that many modifications may be made therein without thereby departing from the scope of the invention as defined in the following claims.

What I claim is:
1. A therapeutic compound of the formula

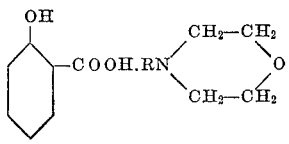

wherein R stands for a member of the group consisting of hydrogen, methyl, ethyl and phenyl.
2. Morpholine salicylate.
3. Methylmorpholine salicylate.
4. A process which comprises reacting equimolecular quantities of salicylic acid with a morpholine in which the nitrogen is coupled with a member of the group consisting of hydrogen, methyl, ethyl and phenyl, in the presence of a substantially inert solvent of at least one of the said reagents, so as to produce a salicylate of said morpholine and then separating out and recovering the morpholine salicylate from the remaining constituents present.
5. A process which comprises reacting equimolecular quantities of salicylic acid with a morpholine in which the nitrogen is coupled with a member of the group consisting of hydrogen, methyl, ethyl and phenyl, in the presence of a substantially inert solvent of both of the said reagents so as to produce a salicylate of said morpholine and then separating out and recovering the morpholine salicylate from the remaining constituents present.
6. A process which comprises reacting equimolecular quantities of salicylic acid with a morpholine in which the nitrogen is coupled with a member of the group consisting of hydrogen, methyl, ethyl and phenyl, in the presence of a substantially inert solvent of both of the said reagents, which is a non-solvent of a product formed, so as to produce a salicylate of said morpholine and then separating out and recovering the morpholine salicylate from the remaining constituents present.
7. A process which comprises reacting in equimolecular quantities salicylic acid with morpholine in the presence of a solvent of at least one of the reagents so as to produce morpholine salicylate, and then separating out and recovering said morpholine salicylate from the remaining constituents present.
8. A process which comprises reacting equimolecular quantities of salicylic acid and a morpholine in which the nitrogen is coupled with a member of the group consisting of hydrogen, methyl, ethyl and phenyl, the reaction being effected in a toluene solution, so as to produce a salicylate of said morpholine and then separating out and recovering the morpholine salicylate from the remaining constituents present.

JULES HENRI THÉOPHILE LEDRUT.

REFERENCES CITED

The following references are of record in the file of this patent:

UNITED STATES PATENTS

| Number | Name | Date |
|---|---|---|
| 615,488 | Knorr | Dec. 6, 1898 |
| 1,923,179 | Ulrich et al. | Aug. 22, 1933 |
| 2,186,628 | Dickey et al. | Jan. 9, 1940 |
| 2,282,907 | ter Horst | May 12, 1942 |
| 2,295,504 | Shelton | Sept. 8, 1942 |

FOREIGN PATENTS

| Number | Country | Date |
|---|---|---|
| 25,905 of 1896 | Great Britain | Oct. 2, 1897 |
| 95,854 | Germany | Jan. 18, 1898 |
| 19,823 | Great Britain | 1898 |